(12) United States Patent
Fabry et al.

(10) Patent No.: US 7,530,914 B2
(45) Date of Patent: *May 12, 2009

(54) HYDROMECHANICAL TRANSMISSION

(75) Inventors: Mark D. Fabry, Dainville (FR);
Michael G. Cronin, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 334 days.

This patent is subject to a terminal disclaimer.

(21) Appl. No.: 11/445,118

(22) Filed: Jun. 1, 2006

(65) Prior Publication Data

US 2006/0276291 A1 Dec. 7, 2006

Related U.S. Application Data

(60) Provisional application No. 60/687,401, filed on Jun. 3, 2005.

(51) Int. Cl.
*F16H 47/04* (2006.01)
(52) U.S. Cl. .................................................. 475/82
(58) Field of Classification Search .................. 74/730.1
See application file for complete search history.

(56) References Cited

U.S. PATENT DOCUMENTS

| | | | |
|---|---|---|---|
| 4,008,628 A | 2/1977 | Orshansky, Jr. | |
| 5,011,463 A | 4/1991 | Jarchow et al. | |
| 5,052,986 A | 10/1991 | Jarchow et al. | |
| 5,080,637 A | 1/1992 | Tenberge et al. | |
| 5,156,577 A * | 10/1992 | Fredriksen et al. | 475/74 |
| 5,403,241 A * | 4/1995 | Jarchow et al. | 475/72 |
| 5,496,223 A | 3/1996 | Jarchow | |
| 5,605,515 A | 2/1997 | Fredriksen | |
| 5,624,339 A | 4/1997 | Coutant et al. | |
| 5,730,678 A | 3/1998 | Larkin | |
| 5,980,411 A | 11/1999 | Wontner | |
| 7,063,638 B2 * | 6/2006 | Weeramantry | 475/74 |
| 2006/0276291 A1* | 12/2006 | Fabry et al. | 475/72 |

FOREIGN PATENT DOCUMENTS

| | | |
|---|---|---|
| DE | 38 15 780 | 12/1988 |
| DE | 3838768 | 6/1989 |
| DE | 4236671 | 11/1993 |
| EP | 0557700 | 9/1993 |
| EP | 1541898 | 6/2005 |

* cited by examiner

*Primary Examiner*—Dirk Wright
(74) *Attorney, Agent, or Firm*—Finnegan, Henderson, Farabow, Garrett & Dunner

(57) ABSTRACT

A hydromechanical transmission having an input member, a hydrostatic transmission, and a mechanical transmission. The mechanical transmission includes first and second synchronizing assemblies for synchronizing at least one of a first or second output member with a combined output speed from the input member and the hydrostatic transmission. First and second clutch assemblies alternately engage to transfer power from the synchronized output member to a final drive.

52 Claims, 13 Drawing Sheets

Fig_6_

HYDROMECHANICAL TRANSMISSION

CROSS-REFERENCE TO RELATED APPLICATIONS

This application claims priority to U.S. Provisional Patent Application No. 60/687,401 entitled "Hydromechanical Transmission" and filed on Jun. 3, 2005 to Michael Cronin and Mark Fabry.

TECHNICAL FIELD

This invention relates generally to continuously variable transmissions and more particularly to hydromechanical transmissions.

BACKGROUND

Multi-range hydromechanical transmissions are well known. Ranges are changed by sequentially disengaging and engaging a number of clutches. The engagement typically occurs under synchronous or near synchronous conditions. That is to say that ranges can be changed without introducing discontinuities into the continuously variable nature of the transmission.

U.S. Pat. No. 5,080,637 ("637") teaches a hydromechanical transmission. The hydromechanical transmission receives split power inputs from an engine; one split input drives a hydrostatic transmission and the other split input drives a mechanical power input. Power combines in the planetary gear set and a series of multi-disc clutches and brakes provide shifting between ranges.

The '637 hydromechanical transmission discussed above shifts through multiple transmission ranges using at least four clutches and two brake assemblies. While multi-disc clutches allow very flexible engagement strategies, they are deficient in several respects. In particular, multi-disc clutches are costly, complex, bulky, and generate losses when not engaged. Market pressures are increasing for a continuously variable transmission with low losses, low complexity, and low cost.

Dog clutches are an alternative to multi-disc clutches. U.S. Pat. No. 3,916,714 to Sisson et al. teaches a sleeved shift-connecting member that is positionable between one of two positions. Selected gear assemblies, in order to provide the desired operation range, must be intermeshed through a dog clutch, which, in turn, necessitates that the gears include negligible rotational speed to carry out the shift. They are economical, compact, and have low losses. However, dog clutches are extremely sensitive to shift conditions, i.e., they must be perfectly synchronized to allow engagement, and they must be unloaded to allow disengagement.

The disclosed transmission is directed to overcoming one or more of the problems set forth above.

SUMMARY OF THE INVENTION

In one exemplary aspect, a continuously variable transmission is provided. The continuously variable transmission includes an input member, a variator connected to the input member, first and second output members, first and second synchronizing assemblies, and first and second engaging means. The first and second synchronizing assemblies rotatably connect to the first and second output members and selectively receive power from the input member and the variator. The first and second engaging means selectively connect the first and second synchronizing assemblies to the first and second output members.

In another exemplary aspect a hydromechanical transmission system is provided. The hydromechanical transmission includes an input member, a hydrostatic transmission coupled to the input member, and a mechanical transmission coupled to the input member and the hydrostatic transmission. The mechanical transmission includes first and second output members, first and second synchronizing assemblies, and first and second engaging means. The first and second synchronizing assemblies rotatably connect to the first and second output members and selectively receive power from the input member and the hydrostatic transmission. The first and second engaging means selectively and alternately connect the first and second synchronizing assemblies to the first and second output members.

In yet another exemplary aspect, a continuously variable transmission is provided. The continuously variable transmission includes an input means, a variator connected to the input means, first and second output means for outputting a combined power from the input means and variator means, first and second synchronizing means for selectively receiving power from the input means and the variator, and first and second engaging means for alternatingly connecting the engaged combined output with the first and second output means.

In still another exemplary aspect, a continuously variable transmission is provided having an input means, a planetary output shaft connected to the input means and having a first and second planetary output gear, a first output member having a first low-speed reduction gear and a first high-speed reduction gear, and a second output member having a second low-speed reduction gear and a second high-speed reduction gear. The first planetary output gear directly meshes the first low-speed reduction gear, and the second planetary output gear directly meshes the second high-speed reduction gear.

In still another exemplary aspect, a method for controlling shifts of a continuously variable transmission is provided. The method includes the steps of providing a first and second power source, outputting a combined power of the first and second power source, synchronizing a speed of the combined output with a rotatable member using a synchronizing assembly, alternately connecting the synchronized rotatable member to an output member using an engaging means, and outputting the power to a final output member.

In still another exemplary aspect a method of selectively activating a synchronizer and a clutch of a hydromechanical transmission, to produce a broader speed range is provided. The method includes the steps of providing a first and second power source, outputting a combined power of the first and second power source, activating a first synchronizer to synchronize a speed of the combined output with a rotatable member, activating a clutch to connect the synchronized rotatable member to an output member, outputting the power to a final output member, activating a second synchronizer to synchronize a speed of the combined output with a second rotatable member, deactivating the clutch, and activating a second clutch to connect the synchronized second rotatable member to the output member.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate exemplary embodiments of the invention and, together with the description, serve to explain the principles of the invention. In the drawings.

DETAILED DESCRIPTION

Reference will now be made to detailed embodiments of the invention, examples of which are illustrated in the accompanying drawings.

Figure 1:
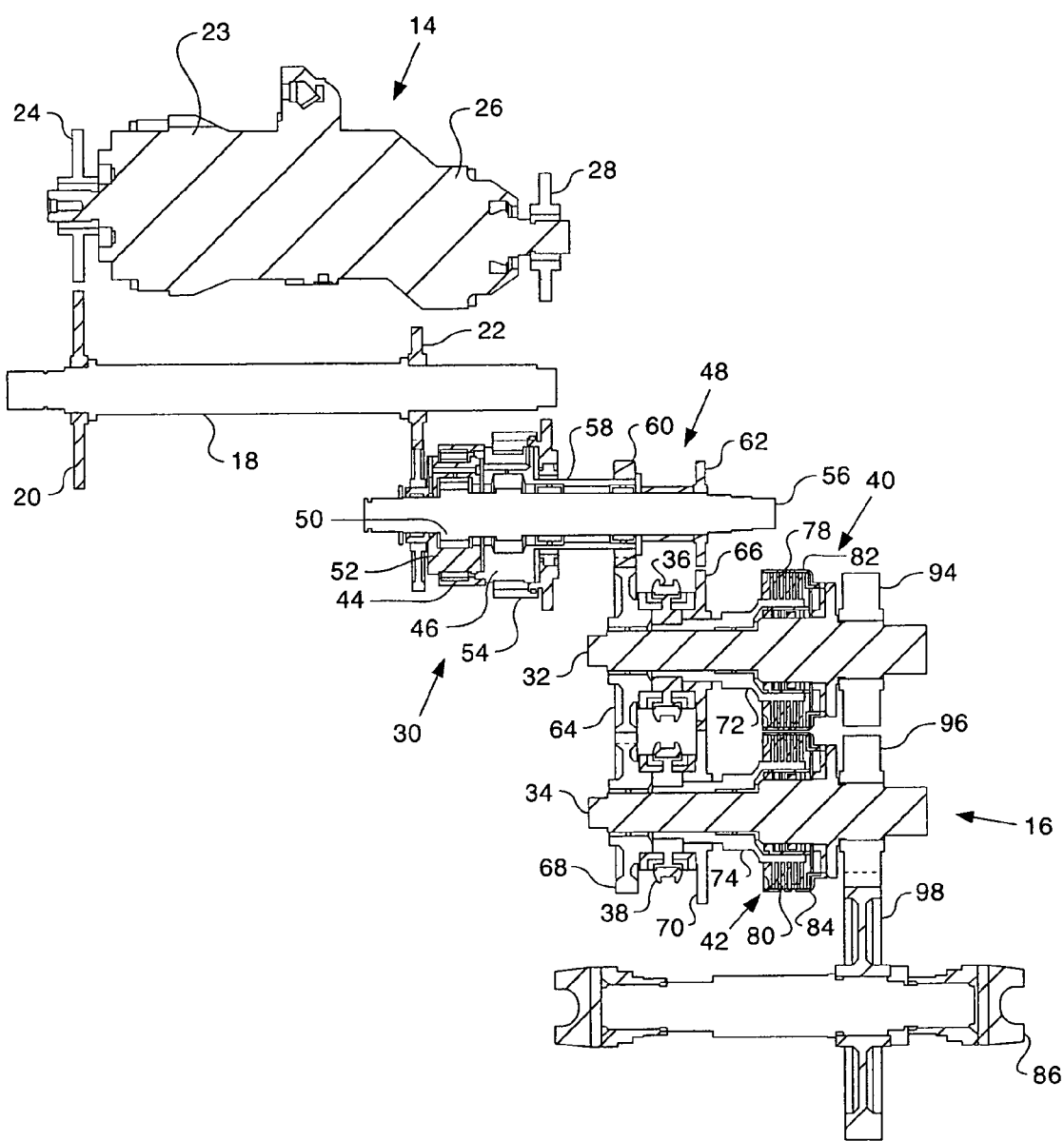
FIG. 1 illustrates a sectional view of a hydromechanical transmission.

FIG. 1 illustrates a cross-sectional view of an exemplary continuously variable transmission. The continuously variable transmission may be a hydromechanical transmission 10 having a variator, such as a hydrostatic transmission (pump and motor) 14, and a mechanical transmission 16. An engine 12 (See FIG. 2) drives the hydromechanical transmission 10 and may be an internal combustion engine, however, it may be any kind of device capable of powering the hydromechanical transmission 10 as described herein. The engine 12 outputs to the hydromechanical transmission 10, through an input member 18.

The input member 18 provides split power to the hydrostatic transmission 14 and the mechanical transmission 16 through first and second fixed input gears 20 and 22. The term "fixed" may be understood as being integral with, permanently attached, interconnected through a splined connection, or fused by welding, for example, or by any other means known to those having ordinary skill in the art.

The hydrostatic transmission 14 includes a variable displacement pump 23 drivingly connected to the engine 12, through a hydrostatic transmission input gear 24, and a motor 26, which outputs through a hydrostatic transmission output gear 28 to the mechanical transmission 16. The motor 26 may be variable displacement or fixed displacement. One skilled in the art will realize that the hydrostatic transmission 14 may also be embodied as an electric generator and electric motor, or other device capable of providing input power, without departing from the scope of the present invention. Similarly, the pump and motor of the hydrostatic transmission may be replaced with an electric motor to form an electro-mechanical transmission. The electric motor may be configured to receive electric power from a battery, a generator, or other device.

The mechanical transmission 16 includes a planetary arrangement 30, first and second output members 32 and 34, first and second synchronizing assemblies, or synchronizers 36 and 38, and first and second disc clutch assemblies 40 and 42.

The planetary arrangement 30 includes first and second axially aligned planetary gear sets 44 and 46, and a planetary output shaft 48. Each planetary gear set 44 and 46 includes a sun gear 50, a carrier 52, and a ring gear 54, as is customary. The planetary output shaft 48 includes an internal shaft 56 and a sleeve 58, such as a hollow member or hub, which is supported by the internal shaft 56. Both the internal shaft 56 and the sleeve 58 exist in axial alignment with each other. The internal shaft 56 connects to the sun gears 50 of the first and second planetary gear sets 44 and 46. The sleeve 58 outputs from the carrier 52 of the second planetary gear set 46 through a first planetary output gear 60. The internal shaft 56 outputs from the sun gears 50 of the first and second planetary gear sets 44 and 46 through a second planetary output gear 62.

The first and second output members 32 and 34 are positioned parallel to the input member 18 and the planetary arrangement 30. The first output member 32 includes a first low-speed reduction gear 64 and a first high-speed reduction gear 66. The second output member 34 includes a second low-speed reduction gear 68 and a second high-speed reduction gear 70.

Each synchronizer 36 and 38 is fixed to a first and second hub, sleeve, or rotating members 72 and 74, respectively, which rotates about the corresponding first or second output member 32 and 34. The synchronizers 36 and 38 are three-position synchronizers adapted to move from a neutral position to either of two positions, dependent on a preferred speed and direction.

Each hub 72 and 74 includes at least one rotatable disc 78 and 80 fixed to an end of the hub 72 and 74, which may be "clutched" or selectively retained by an engaging means, or friction-disc clutches 82 and 84, which generally overlays the rotatable discs 78 and 80, as is customary. Together, the rotatable discs 78 and 80 and friction-disc clutches 82 and 84 embody the first and second clutch assemblies 40 and 42. In one embodiment, the clutch assemblies 40 and 42 are known hydraulically-engaged and spring-disengaged rotating frictional clutch assemblies which may be selectively engaged to provide power to the first or second output members 32 and 34 and to a final output member 86.

The low-speed and high-speed reduction gears 64, 66, 68, and 70 freely rotate about the first and second output members 32 and 34 while disengaged. Roller bearings 90 and 92 on the first and second output members 32 and 34 support the low-speed and high-speed reduction gears 64, 66, 68, and 70. When either of the first or second synchronizers 36 and 38 is engaged with either of the low-speed or high-speed reduction gears 64, 66, 68, and 70, the first or second hub 72 and 74 rotates at the same revolutions per unit of time as the engaged low-speed or high-speed reduction gear 64, 66, 68, and 70.

First and second output shaft gears 94 and 96 fixed to the first and second output members 32 and 34 intermesh a final drive gear 98 of the final output member 86.

As is customary, the input member 18, planetary output shaft 48, first and second output members 32 and 34, and final output member 86 are supported within a transmission housing (not shown) and rotate about bearings, or the like, (not shown) held within the housing.

INDUSTRIAL APPLICABILITY

The hydromechanical transmission 10 advantageously provides synchronous range shifting that affords smooth and uninterrupted power flow from the engine 12, as the vehicle accelerates from rest to maximum speed. The engine 12 may be operated at or near its peak efficiency output speed, regardless of transmission output speed.

Referring to FIGS. 2-13, in operation, the input member 18 delivers split input power to the hydrostatic transmission 14 and the planetary arrangement 30. Specifically, the first and second fixed input gears 20 and 22 simultaneously rotate upon rotation of the input member 18 and transfer power through the hydrostatic transmission input gear 24 and a first planetary input member 102. The pump 23 of the hydrostatic transmission 14 uses the split input power to fluidly drive a motor 26 to convert the input power from the engine 12 to hydrostatic output power over a continuously variable speed ratio. The hydrostatic transmission 14 outputs through the hydrostatic output gear 28 to the planetary arrangement 30. Specifically, the hydrostatic transmission 14 outputs through the hydrostatic output gear 28 to a second planetary input member 104.

The planetary arrangement 30 combines the hydrostatic output power from the second planetary input member 104 with the split input mechanical power to provide hydromechanical output power for application to a load, such as one or more driving wheels of a vehicle, or tracks of an earth-working machine. The speed and torque in each of the power ranges initially set by gear ratios of the planetary arrangement 30 can be infinitely varied by varying the stroke of the hydrostatic transmission 14.

The combined hydromechanical output power, indicated as arrows 100 and 106, outputs through the internal shaft 56 connected to the sun gears 50 of the first and second planetary gear sets 44 and 46, and through the sleeve 58, connected to the planet carrier 52 of the second planetary gear set 46. The second planetary output gear 62 intermeshes the second high-speed reduction gear 70, which drives the first high-speed reduction gear 66. Accordingly, as the second planetary output gear 62 rotates, the high-speed reduction gears 66, 70 also rotate. Likewise, the first planetary output gear 60 intermeshes the first low-speed reduction gear 64, which drives the second low-speed reduction gear 68. Accordingly, as the first planetary output gear 60 rotates, the low-speed reduction gears 64, 68 also rotate.

Figure 2:
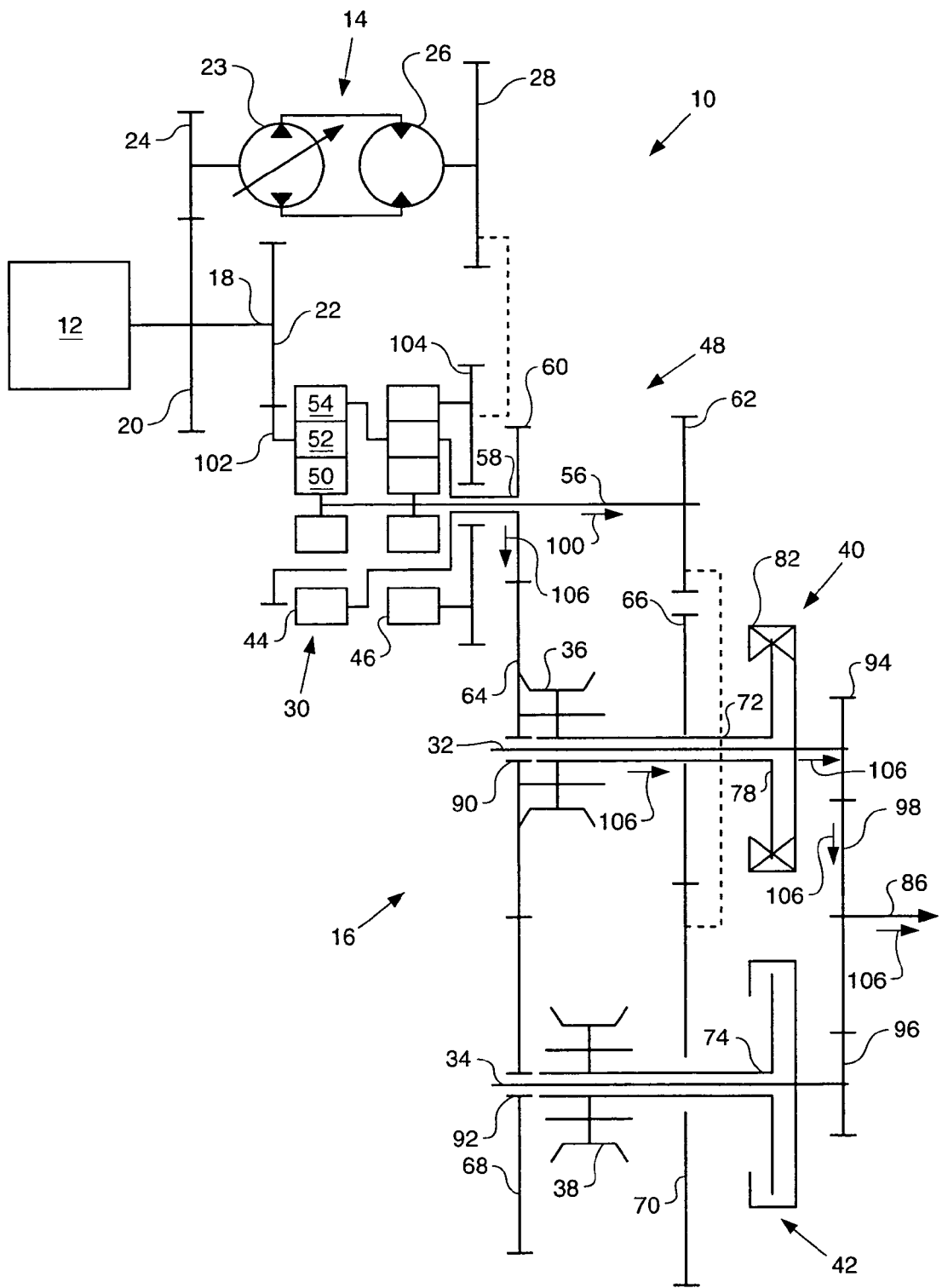
FIG. 2 illustrates a schematic view of a hydromechanical transmission in a low-forward mode.

Referring specifically to FIG. 2, in order to output a low-speed in the forward direction, the first synchronizing assembly 36 operates to engage the first low-speed reduction gear 64 to the first hub 72. After the first low-speed reduction gear 64 and the first hub 72 engage, the first friction-disc clutch 82 of the first clutch assembly 40 operates to "clutch" the rotatable disc 78. When the first friction-disc clutch 82 fully clutches the rotatable disc 78, the first output shaft gear 94 drives the final drive gear 98, which outputs through the final output member 86 to the wheels or tracks. Arrows 106 indicate power flow. The transmission operates normally within the low-forward range as a continuously variable hydromechanical transmission. As long as the second synchronizing assembly 38 remains disengaged, the relative speed, and therefore the viscous drag loss of the second clutch assembly 42, is substantially zero.

Figure 3:
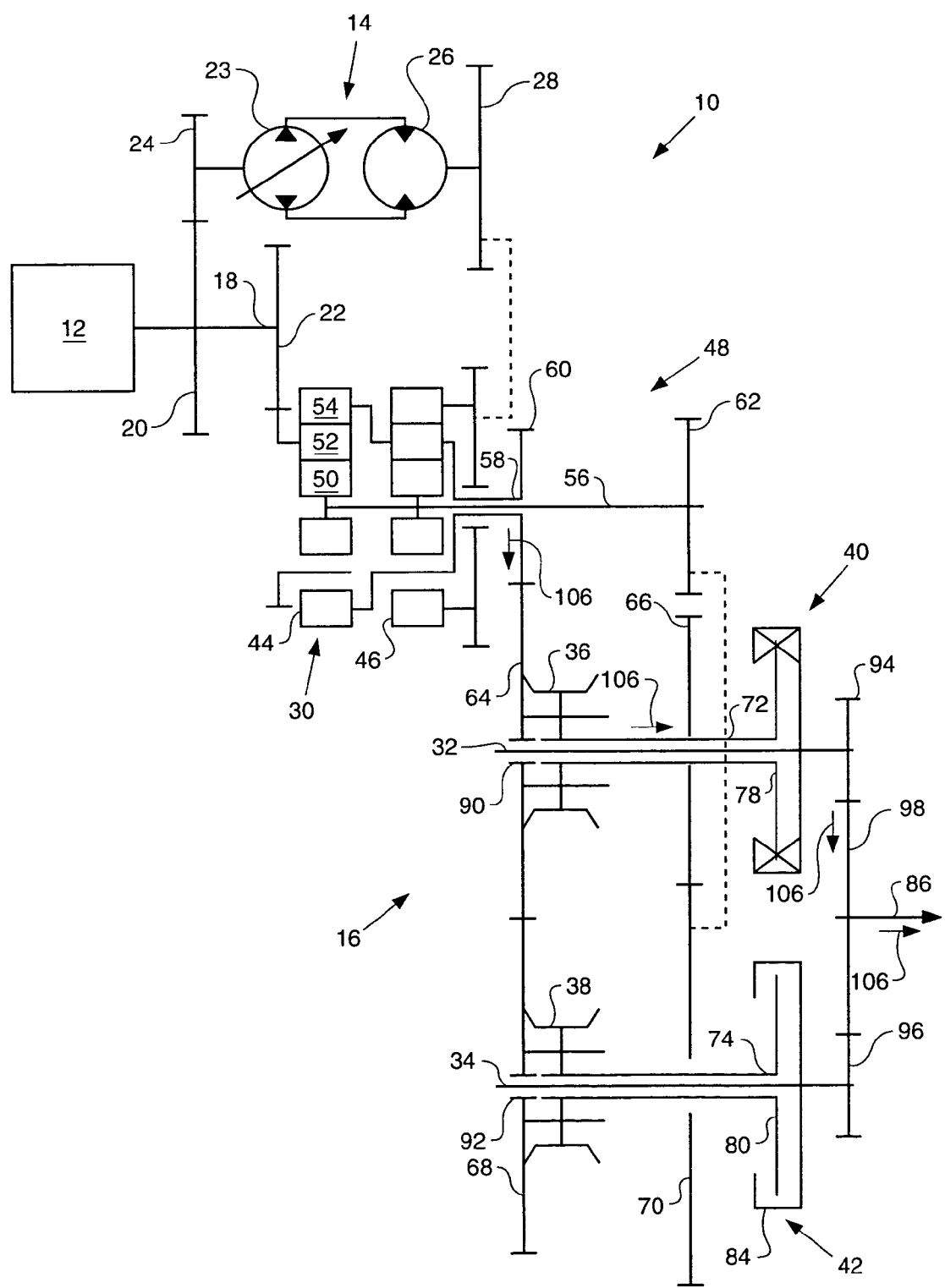
FIGS. 3 and 4 illustrate schematic views of a hydromechanical transmission performing a shift from a low-forward to a low-reverse mode.
Figure 4:
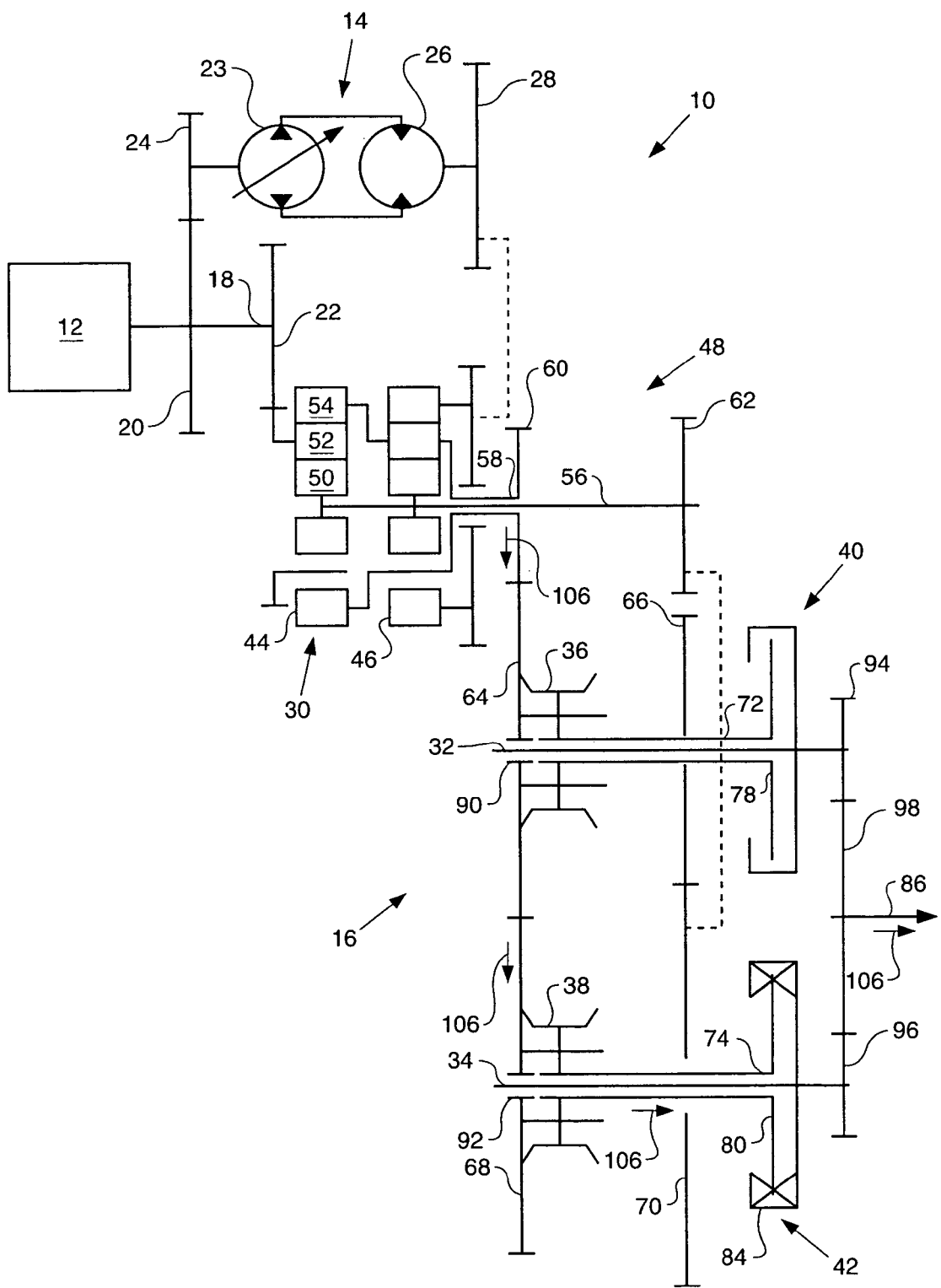
Figure 5:
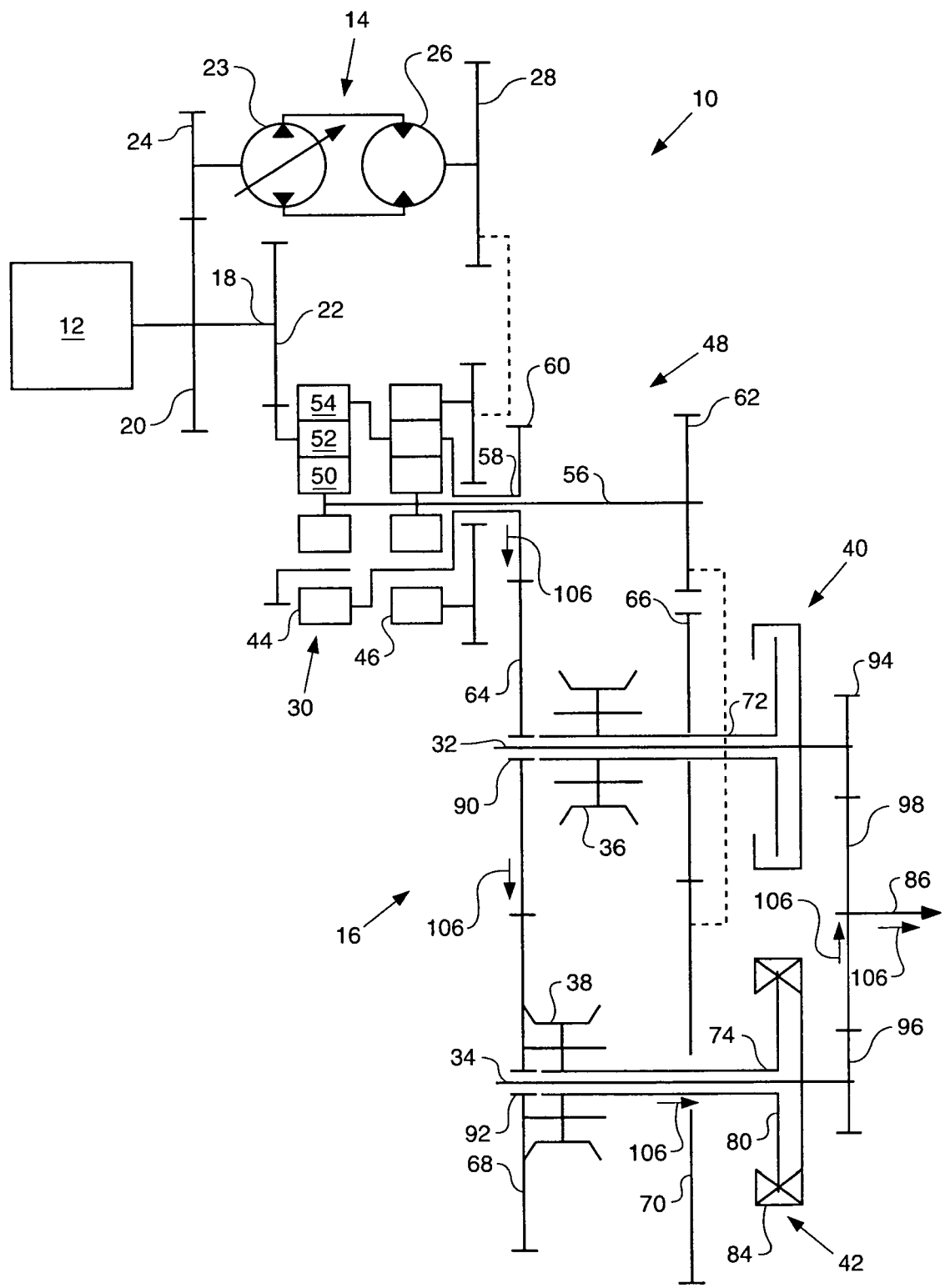
FIG. 5 illustrates a schematic view of a hydromechanical transmission in a low-reverse mode.

FIGS. 3-5 illustrate schematic views of the hydromechanical transmission performing a shift from low-forward to low-reverse. In the illustrated embodiment, the first synchronizing assembly 36 and first clutch assembly 40 are in an engaged state. When the transmission control determines that a range change into low-reverse may be imminent, the second synchronizing assembly 38 operates to engage the second low-speed reduction gear 68 to synchronize the second hub 74 with the speed of the second low-speed reduction gear 68. In other words, the second synchronizing assembly 38 operates to decrease relative speed, preferably to zero, between the second low-speed reduction gear 68 and the second hub 74. When the speed of the second low-speed reduction gear 68 and speed of the second hub 74 are equal, or substantially equal, the second low-speed reduction gear 68 and the second hub 74 fully engage in a releasably locked position, as is well known in the art. The relative speed, and therefore the viscous drag loss, of the second clutch assembly 42 is now low to moderate. At this point, however, power is still being transmitted through the first low-speed reduction gear 64 and into the first hub 72. Normal continuously variable hydromechanical transmission operation in the low-forward range continues.

After the synchronization of the second low-speed reduction gear 68 and the second hub 72 and when the transmission control determines that a range change is required, the first friction-disc clutch 82 operates to release the rotatable disc 78, and the second fiction-disc clutch 84 operates to "clutch" the corresponding rotatable disc 80. When the second friction-disc clutch 84 fully clutches the rotatable disc 80, the second output member 34 rotates at the same speed as the second hub 74. The second output shaft gear 96 intermeshes with the final drive gear 98, which outputs through the final output member 86 to the wheels or tracks. Arrows 106 indicate the flow of power through the hydromechanical transmission.

After the first clutch assembly 40 releases, as shown in FIG. 4, normal hydromechanical transmission operation resumes in low-reverse. Clutch loss now occurs in the newly disengaged first clutch assembly 40, but only low to moderate levels in the single clutch.

Referring to FIG. 5, the first synchronizing assembly 36 releases the first low-speed reduction gear 64. The relative speed and viscous drag loss of the first clutch assembly 40 drops to substantially zero. Normal hydromechanical transmission operation continues in low-reverse.

Figure 6:
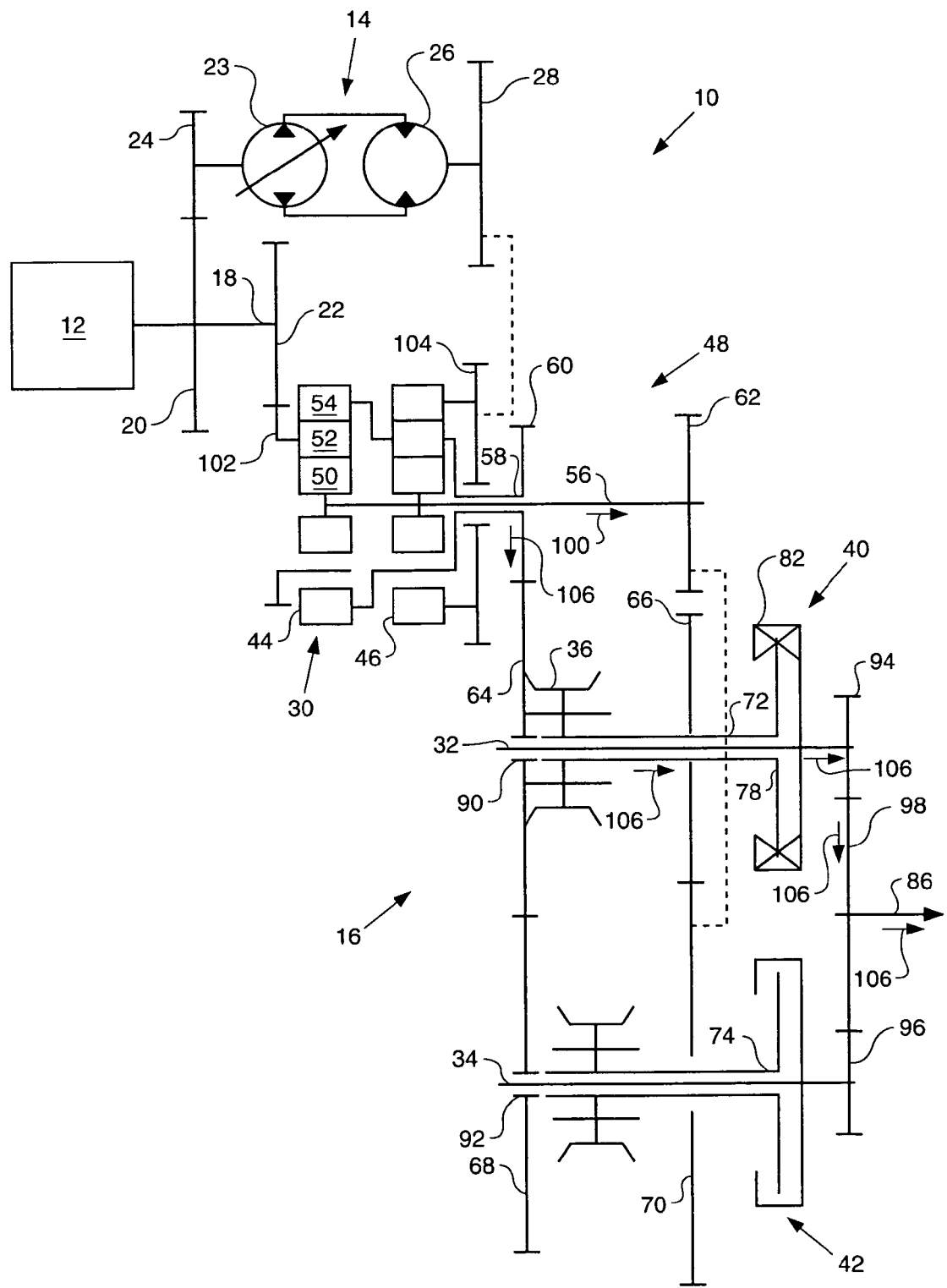
FIG. 6 illustrates a schematic view of a hydromechanical transmission in a low-forward mode.

FIGS. 6-9 illustrate a schematic view of a hydromechanical transmission performing a shift from low-forward to high-forward. Referring specifically to FIG. 6, the first synchronizing assembly 36 operates to engage the first low-speed reduction gear 64 to the first hub 72. After the first low-speed reduction gear 64 and the first hub 72 engage, the first friction-disc clutch 82 of the first clutch assembly 40 operates to "clutch" the rotatable disc 78. When the first friction-disc clutch 82 fully clutches the rotatable disc 78, the first output shaft gear 94 drives the final drive gear 98, which outputs through the final output member 86 to the wheels or tracks. Arrows 106 indicate power flow. The transmission operates normally within the low-forward range as a continuously variable hydromechanical transmission. As long as the second synchronizing assembly 38 remains disengaged, the relative speed, and therefore the viscous drag loss of the second clutch assembly 42, is substantially zero.

Figure 7:
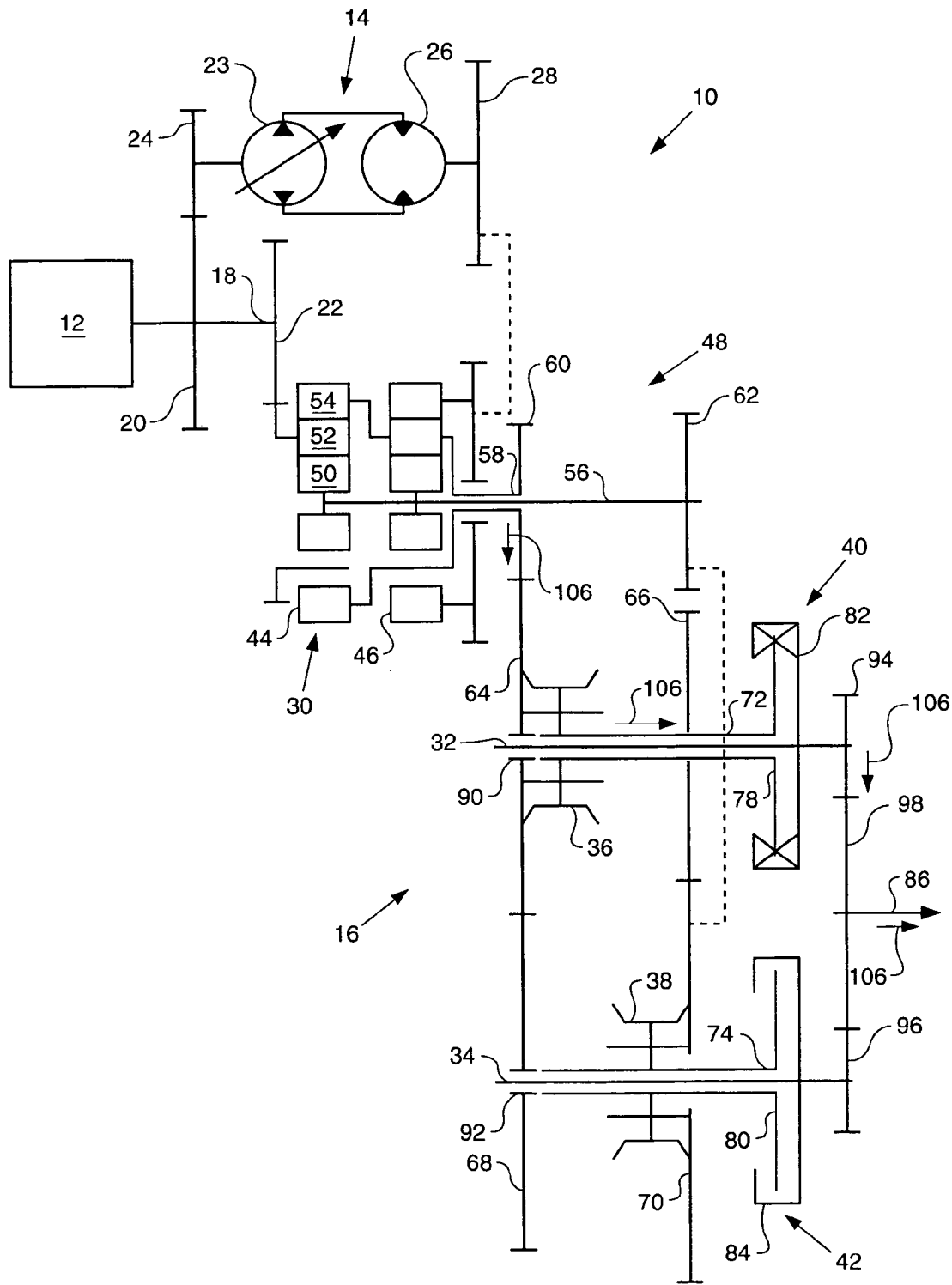
FIGS. 7 and 8 illustrate schematic views of a hydromechanical transmission performing a shift from a low-forward to a high-forward mode.
Figure 8:
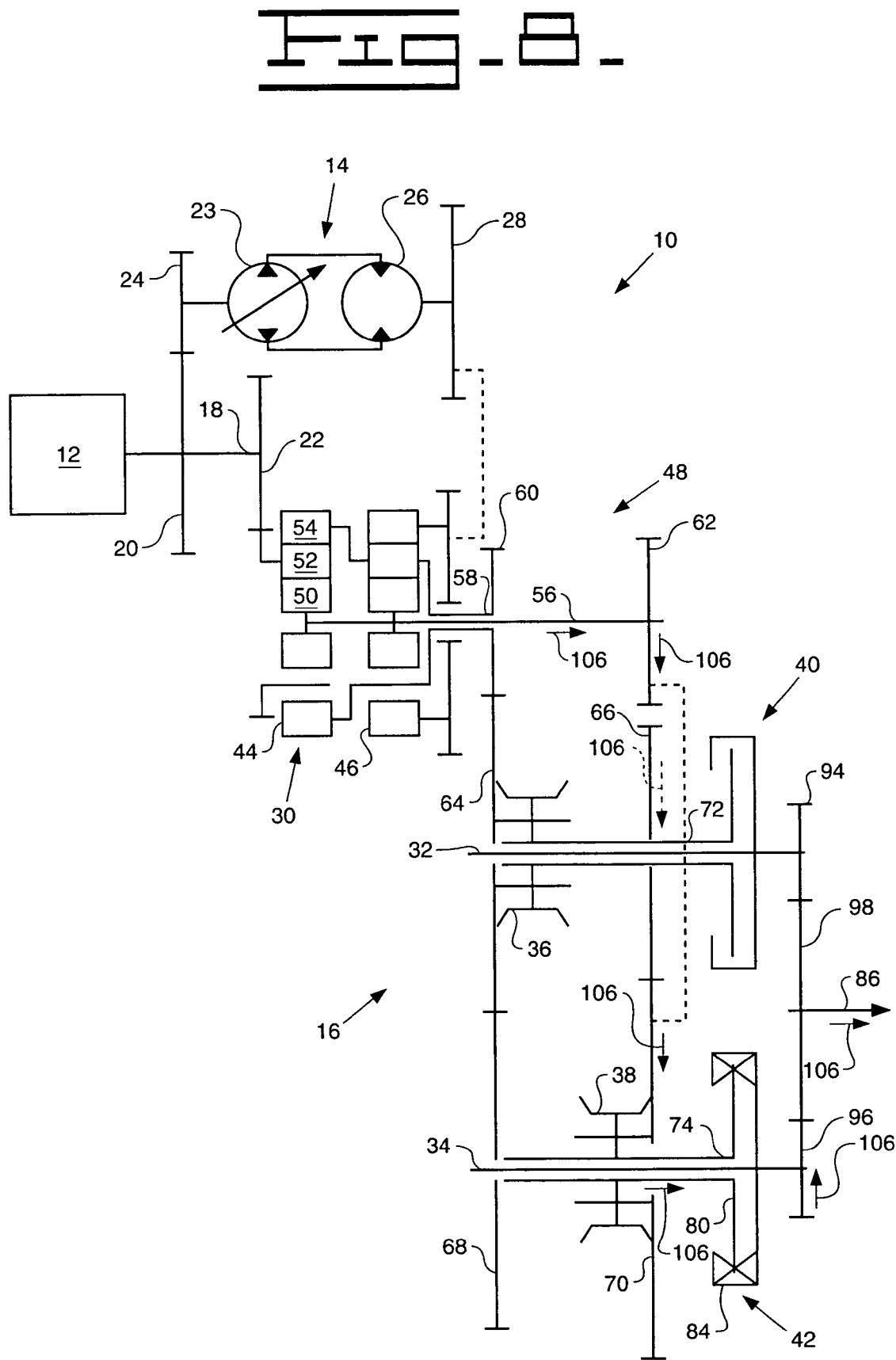

Referring to FIGS. 7 and 8, when the transmission control determines that a range change into high-forward may be imminent, the second synchronizing assembly 38 operates to engage the second high-speed reduction gear 70 to synchronize the second hub 74 with the speed of the second high-speed reduction gear 70. When the speed of the second high-speed reduction gear 70 and the speed of the second hub 74 are equal, or substantially equal, the second high-speed reduction gear 70 and the second hub 74 fully engage in a releasably locked position, as is well known in the art. The relative speed, and therefore the viscous drag loss, of the second friction-disc clutch 42 is now low to moderate. At this point, however, power is still being transmitted through the first hub 72 at a low-speed forward. Normal continuously variable hydromechanical transmission operation in the low-forward range continues.

After synchronization of the second high-speed reduction gear 70 and the second hub 74 and when the transmission control determines that a range change is required, the first friction-disc clutch 82 operates to release the rotatable disc 78, and the second friction-disc clutch operates to "clutch" the corresponding rotatable disc 80 (See FIG. 8). When the second friction-disc clutch 84 fully clutches the rotatable disc 80, the second output member 34 rotates at the same speed as the second hub 74. The second output shaft gear 96 intermeshes with the final drive gear 98, which outputs through the final output member 86 to the wheels or tracks. Arrows 106 indicate the flow of power through the hydromechanical transmission. After the first clutch assembly 40 releases, but before the first synchronizing assembly 36 releases, clutch loss occurs in the newly disengaged first clutch assembly 40, but only at low to moderate levels.

Figure 9:
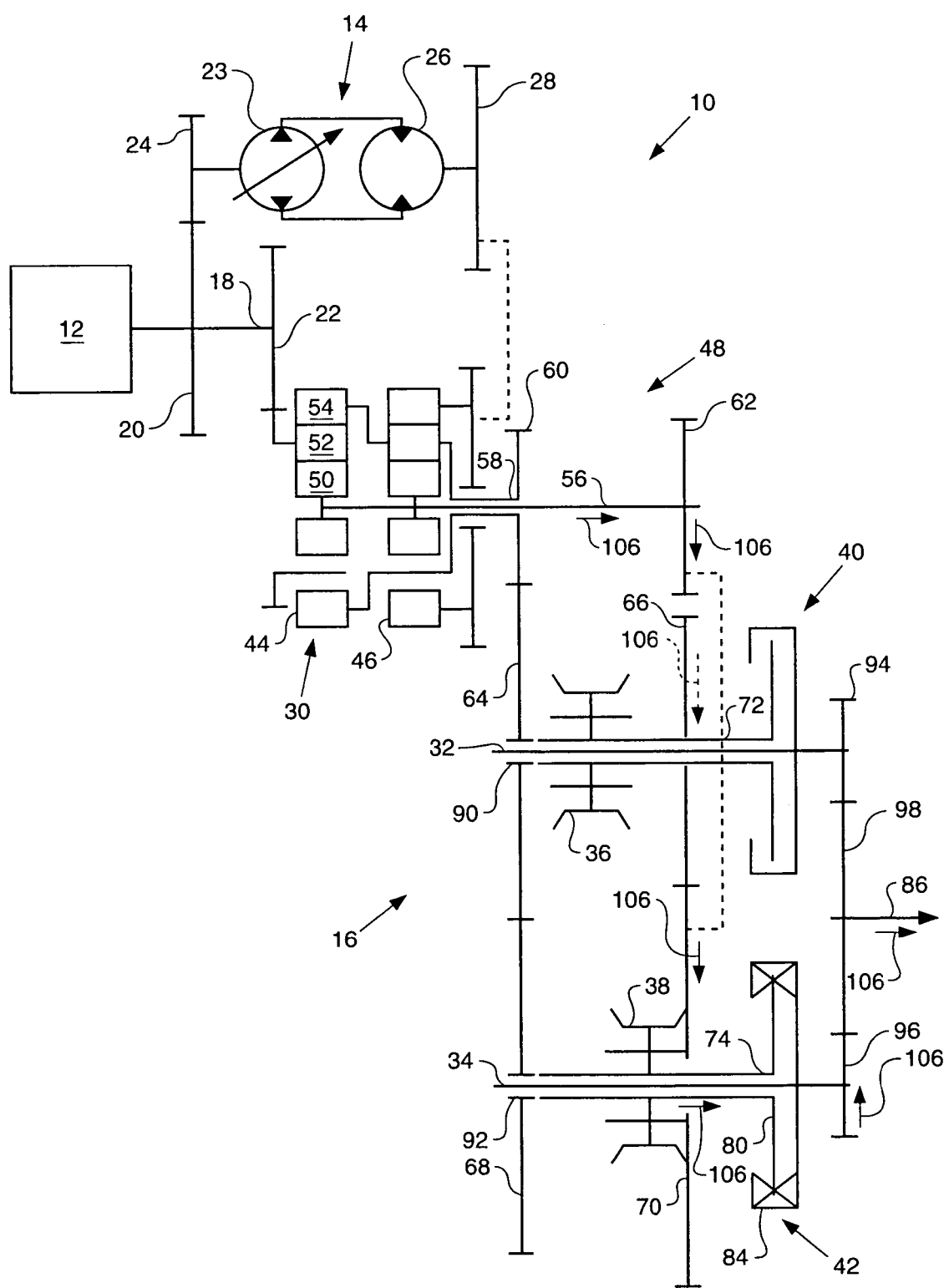
FIG. 9 illustrates a schematic view of a hydromechanical transmission in a high-forward mode.
Figure 10:
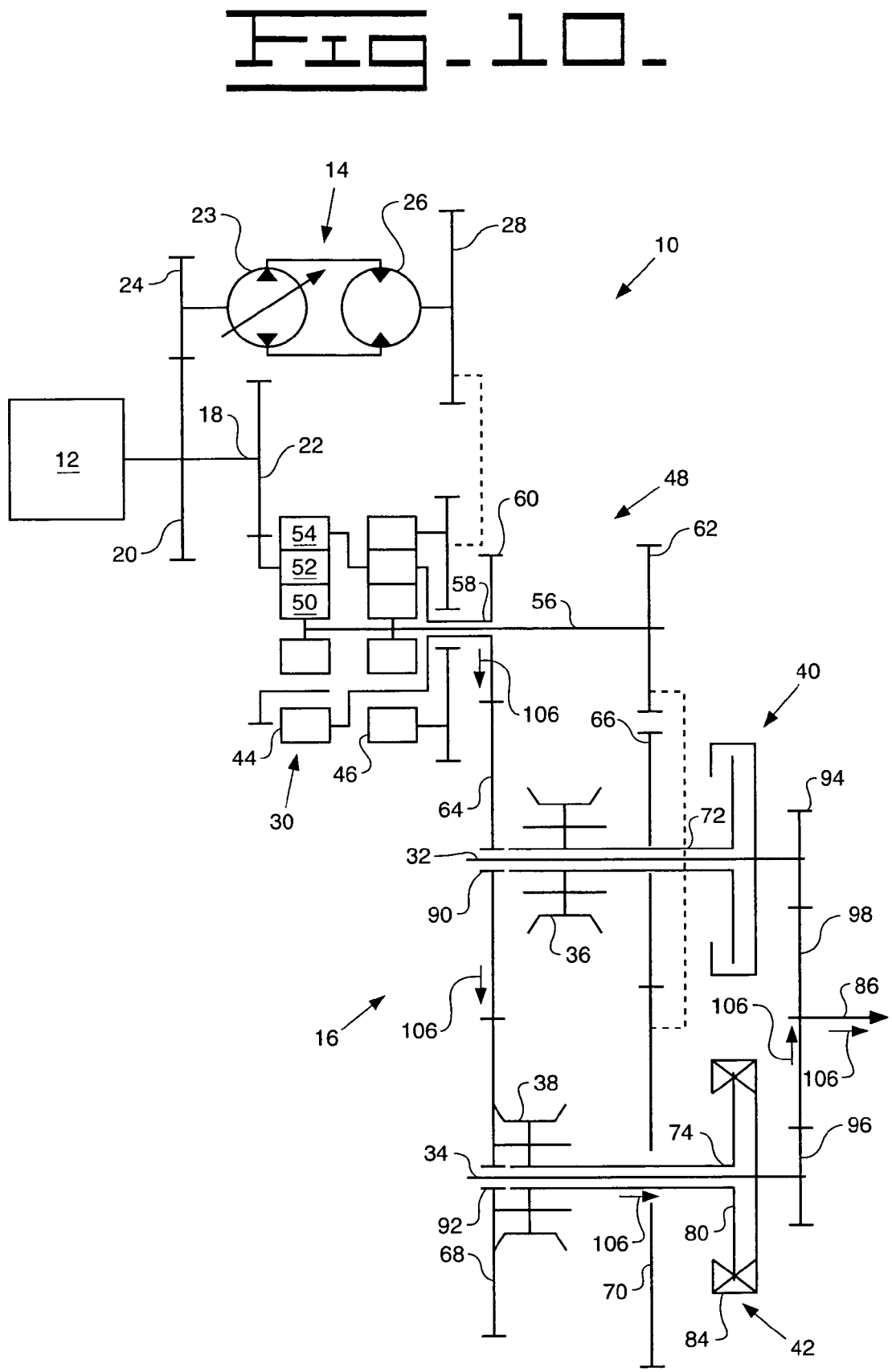
FIG. 10 illustrates a schematic view of a hydromechanical transmission in a low-reverse mode.

Referring to FIG. 9, after the first synchronizing assembly 36 releases the first low-speed reduction gear 64 the relative speed and viscous drag loss of the first clutch assembly 40 drops to substantially zero. Normal hydromechanical transmission operation continues in high-forward. The transmission operates normally within the high-forward range as a continuously variable hydromechanical transmission. As long as the first synchronizing assembly 36 remains disengaged, the relative speed, and therefore the viscous drag loss of the first clutch assembly 40 is substantially zero.

FIGS. 10-13 illustrate schematic views of a hydromechanical transmission performing a shift from low-reverse to high-reverse. In the illustrated embodiment of FIG. 10, the second synchronizing assembly 38 and second clutch assembly 42 are in an engaged state. When the transmission control determines that a range change into a high-reverse may be imminent, the first synchronizing assembly 36 operates to synchronize the first hub 72 with the speed of the first high-speed reduction gear 66. When the speed of the first high-speed reduction gear 66 and the speed of the first hub 72 are equal, or substantially equal, the first high-speed reduction gear 66 and the first hub 72 fully engage in a releasably locked position, as is well known in the art. The relative speed, and therefore the viscous drag loss, of the first clutch assembly 40 is now low to moderate. At this point, however, power is still being transmitted through the second hub 74 and the second clutch assembly 42 to the final output member 86 in a low-speed reverse. Normal continuously variable hydromechanical transmission operation in the low-reverse range continues.

Figure 11:
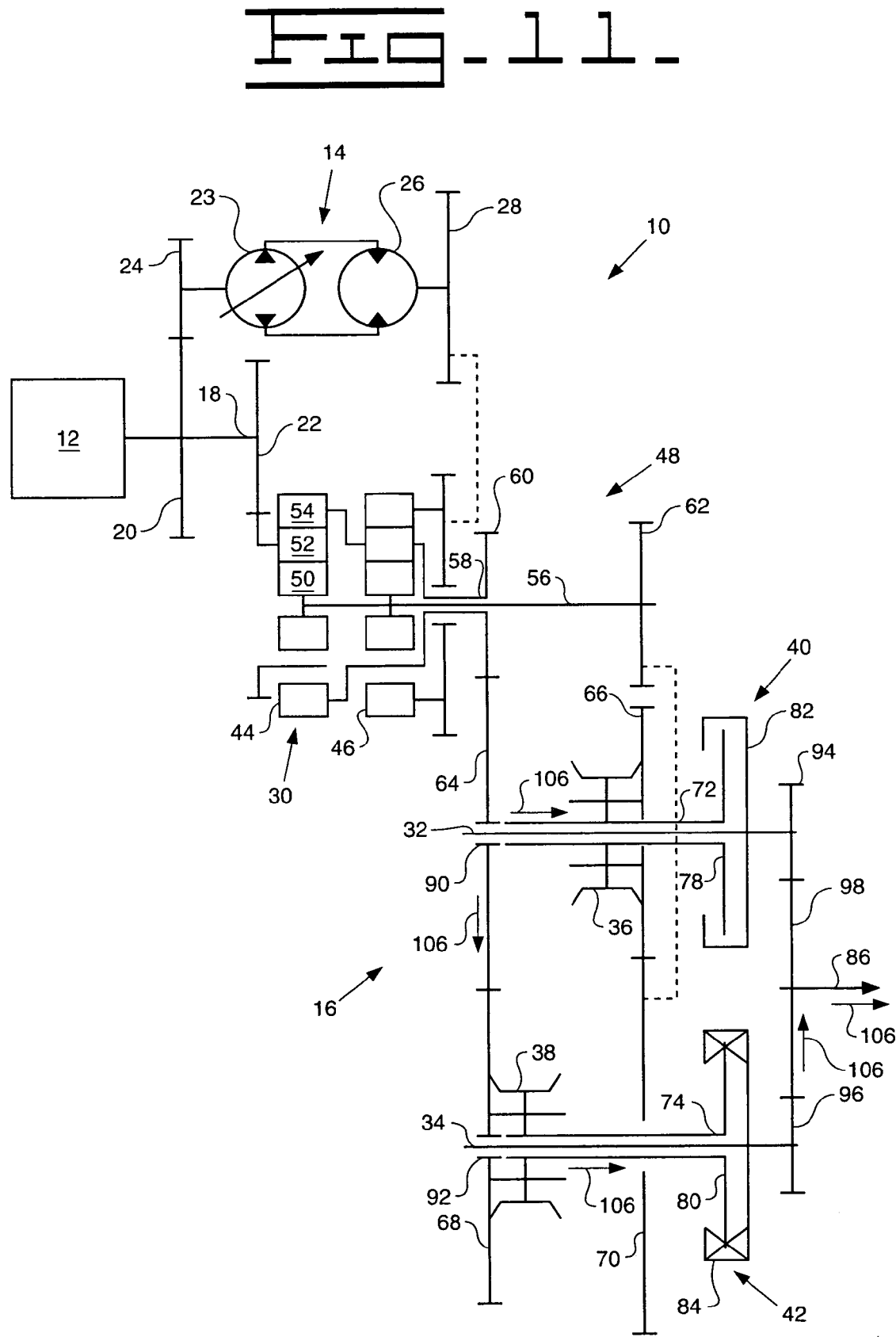
FIGS. 11 and 12 illustrate schematic views of a hydromechanical transmission performing a shift from a low-reverse to a high-reverse mode.
Figure 12:
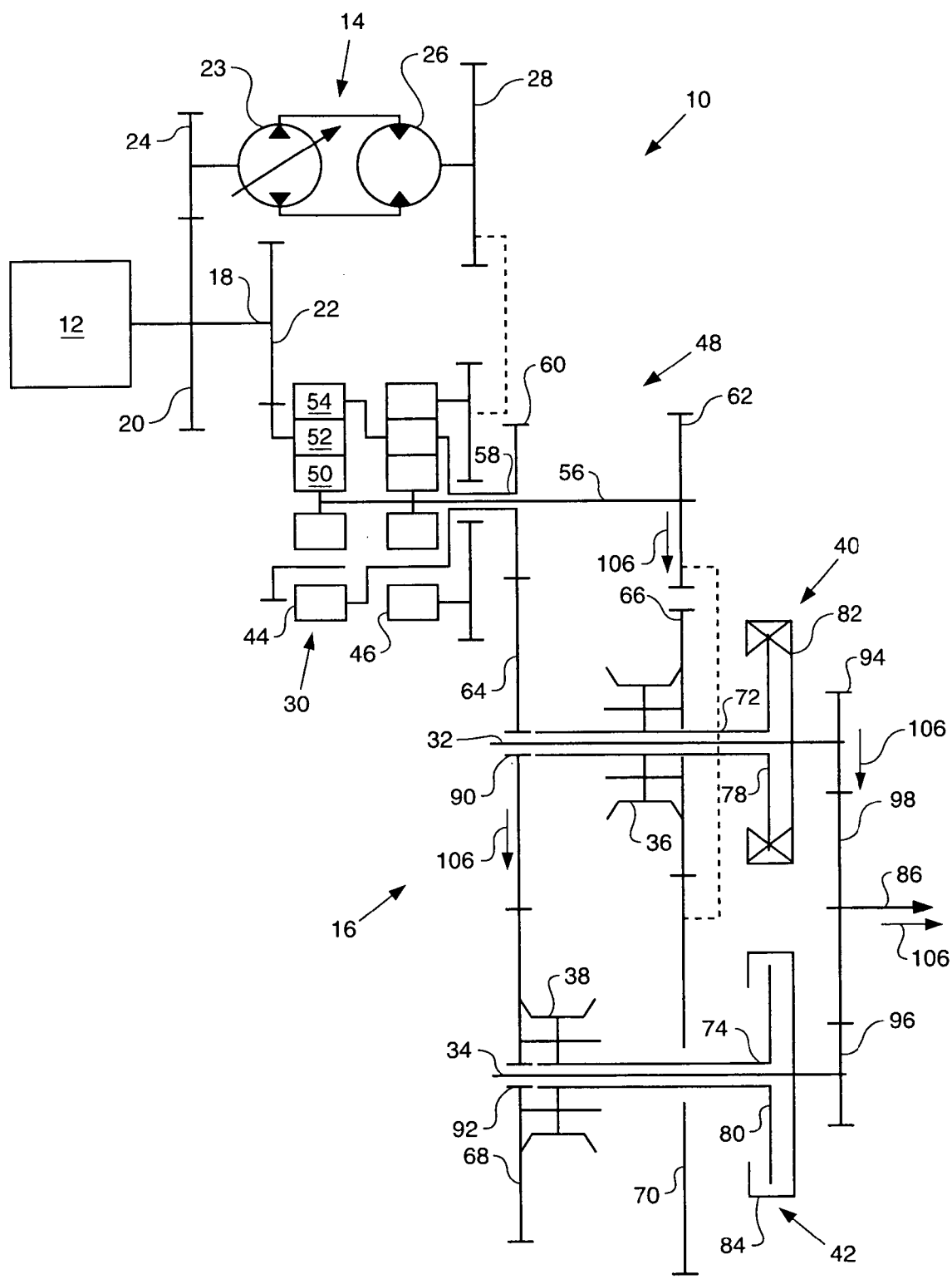

As shown in FIGS. 11 and 12, after the synchronization of the first high-speed reduction gear 66 and the first hub 72 and when the transmission control determines that a range change is required, the second friction-disc clutch 84 operates to release the rotatable disc 80, and the first friction-disc clutch 82 operates to "clutch" the corresponding rotatable disc 78. When the first friction-disc clutch 82 fully clutches the rotatable disc 78, the first output member 32 rotates at the same speed as the first hub 72. The first output shaft gear 94 intermeshes with the final drive gear 98, which outputs through the final output member 86 to the wheels or tracks (not shown). Arrows 106 indicate power flow through the hydromechanical transmission 10. After the second clutch assembly 42 releases, but before the second synchronizing assembly 38 releases, clutch loss occurs in the newly disengaged second clutch assembly 42, but only at low to moderate levels.

Figure 13:
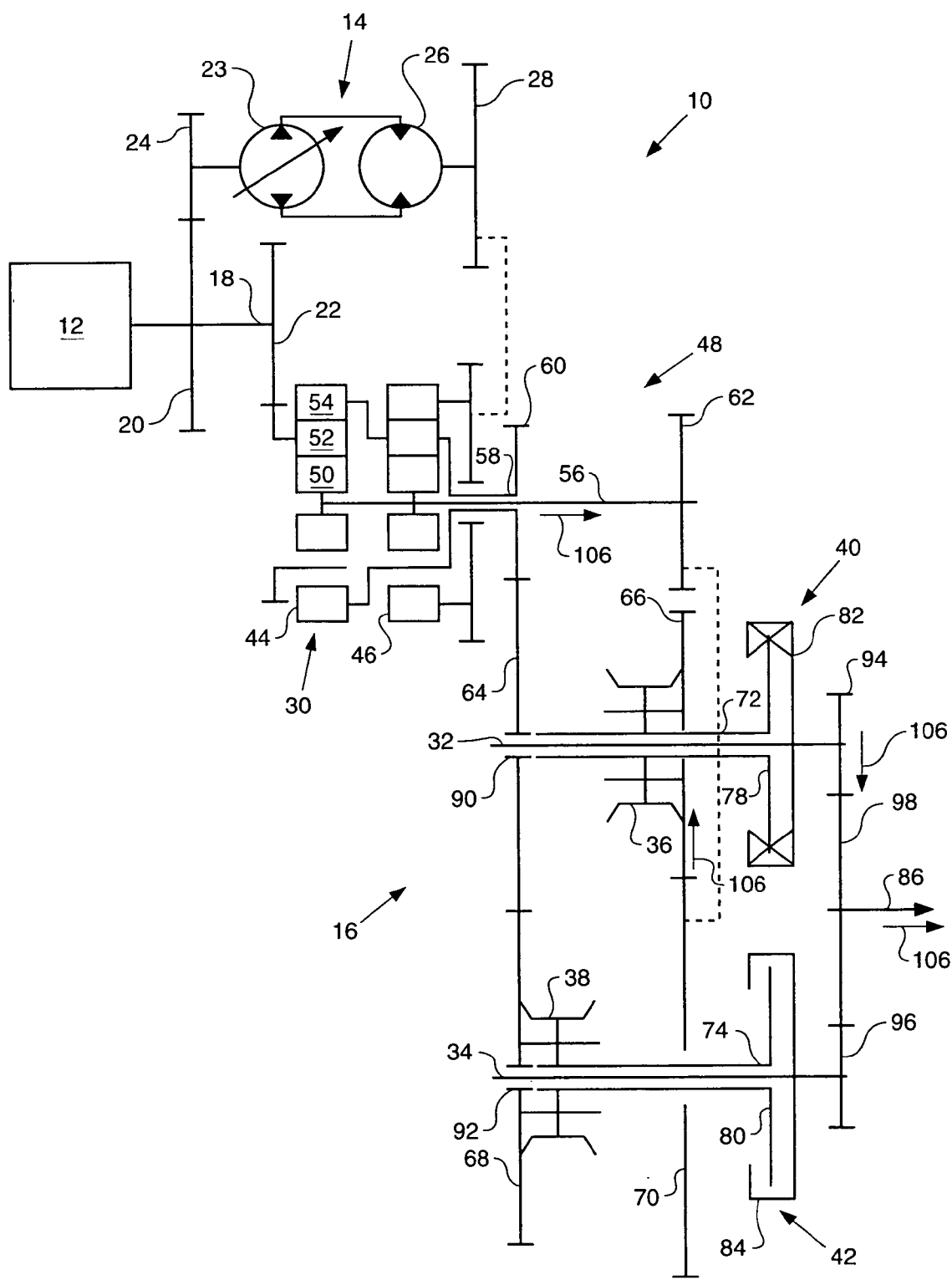
FIG. 13 illustrates a schematic view of a hydromechanical transmission in a high-reverse mode.

Referring to FIG. 13, after the second synchronizing assembly 38 releases the second low-speed reduction gear 68 the relative speed and viscous drag loss of the second clutch assembly 42 drops to substantially zero. Normal hydromechanical transmission operation continues in high-reverse. The transmission operates normally within the high-reverse range as a continuously variable hydromechanical transmission. As long as the second synchronizing assembly 38 remains disengaged, the relative speed, and therefore the viscous drag loss of the second clutch assembly 42, is substantially zero.

It will be apparent to those skilled in the art that various modifications and variations can be made in the disclosed transmission without departing from the scope or spirit of the embodiments of the invention. Other embodiments will be apparent to those skilled in the art from consideration of the specification and practice of the disclosed embodiments disclosed herein. It is intended that the specification and examples be considered as exemplary only.

What is claimed is:

1. A continuously variable transmission comprising:
an input member;
a variator connected to the input member;
first and second output members;
first and second synchronizing assemblies rotatably connected to the first and second output members and operative to selectively receive power from the input member and the variator; and
first and second engaging means connected to the first and second output members and configured to selectively connect the first and second synchronizing assemblies to the first and second output members to transmit the power to a final output member.

2. The continuously variable transmission according to claim 1, wherein the variator comprises a motor and a pump.

3. The continuously variable transmission according to claim 1, further comprising a planetary arrangement driven by the input member and the variator, and configured to combine power from the input member and the variator and output the combined power.

4. The continuously variable transmission according to claim 3, wherein the planetary arrangement comprises at least a first and second planetary gear set.

5. The continuously variable transmission according to claim 4, wherein the input member is directly connected to a planet carrier of the first planetary gear set.

6. The continuously variable transmission according to claim 3, further comprising first and second hubs rotatably connected to the first and second output members, respectively, and connected to the first and second synchronizing assemblies, respectively.

7. The continuously variable transmission according to claim 6, wherein each of the first and second output members comprise a low-speed reduction gear and a high-speed reduction gear, the low and high-speed reduction gears of the first and second output members drivingly engage output gears of the planetary arrangement, and wherein the first and second synchronizing assemblies selectively synchronize the first and second hubs with the low and high-speed reduction gears.

8. The continuously variable transmission according to claim 7, wherein a planet carrier of the second planetary gear set drives the low-speed reduction gears of the first and second output members.

9. The continuously variable transmission according to claim 7, wherein sun gears from the first and second planetary gear sets drive the high-speed reduction gears of the first and second output members.

10. The continuously variable transmission according to claim 7, wherein when the first synchronizing assembly synchronizes the first hub with the low-speed reduction gear of the first output member, and when the first engaging means is engaged, the transmission outputs a low speed in a forward direction.

11. The continuously variable transmission according to claim 7, wherein when the second synchronizing assembly synchronizes the second hub with the low-speed reduction gear of the second output member, and when the second engaging means is engaged, the transmission outputs a low speed in a reverse direction.

12. The continuously variable transmission according to claim 7, wherein when the first synchronizing assembly synchronizes the first hub with the high-speed reduction gear of the first output member, and when the first engaging means is engaged, the transmission outputs a high speed in a reverse direction.

13. The continuously variable transmission according to claim 7, wherein when the second synchronizing assembly synchronizes the second hub with the high-speed reduction gear of the second output member, and when the second engaging means is engaged, the transmission outputs a high speed in a forward direction.

14. The continuously variable transmission according to claim 1, wherein the synchronizing assemblies are three position synchronizers.

15. The continuously variable transmission according to claim 1, wherein the engaging means are clutches having friction discs.

16. A hydromechanical transmission system, comprising:
an input member;
a hydrostatic transmission drivingly connected to the input member; and
a mechanical transmission drivingly connected to the input member and the hydrostatic transmission, wherein the mechanical transmission includes:
first and second output members;
first and second synchronizing assemblies rotatably connected to the first and second output members and operative to receive power from the input member and the variator; and
first and second engaging means connected to the first and second output members and configured to selectively and alternately connect the first and second synchronizing assemblies to the first and second output members; and
a final output member drivingly engaged to the first and second output members.

17. The hydromechanical transmission system according to claim 16, wherein the hydrostatic transmission comprises a motor and a pump.

18. The hydromechanical transmission system according to claim 16, wherein the mechanical transmission further includes a planetary arrangement configured to combine power from the input member and the hydrostatic transmission.

19. The hydromechanical transmission system according to claim 18, wherein the planetary arrangement comprises at least a first and second planetary gear set.

20. The hydromechanical transmission system according to claim 19, wherein the input member connects to a planet carrier of the first planetary gear set.

21. The hydromechanical transmission system according to claim 18, wherein the mechanical transmission further includes first and second hubs rotatably connected to the first and second output members, and connected to the first and second synchronizing assemblies.

22. The hydromechanical transmission system according to claim 21, wherein each of the first and second output members comprise a low-speed reduction gear and a high-speed reduction gear, the low and high-speed reduction gears of the first and second output members drivingly engage the combined output of the planetary arrangement, and wherein the first and second synchronizing assemblies selectively synchronize the first and second hubs with the low and high-speed reduction gears.

23. The hydromechanical transmission system according to claim 19, wherein a planet carrier of the second planetary gear set drives the low-speed reduction gears of the first and second output members.

24. The hydromechanical transmission system according to claim 19, wherein sun gears from the first and second planetary gear sets drive the high-speed reduction gears of the first and second output members.

25. The hydromechanical transmission system according to claim 22, wherein when the first synchronizing assembly synchronizes the first hub with the low-speed reduction gear of the first output member, and when the first engaging means is engaged, the transmission outputs a low speed in a forward direction.

26. The hydromechanical transmission system according to claim 22, wherein when the second synchronizing assembly synchronizes the second hub with the low-speed reduction gear of the second output member, and when the second engaging means is engaged, the transmission outputs a low speed in a reverse direction.

27. The hydromechanical transmission system according to claim 22, wherein when the first synchronizing assembly synchronizes the first hub with the high-speed reduction gear of the first output member, and when the first engaging means is engaged, the transmission outputs a high speed in a reverse direction.

28. The hydromechanical transmission system according to claim 22, wherein when the second synchronizing assembly synchronizes the second hub with the high-speed reduction gear of the second output member, and when the second engaging means is engaged, the transmission outputs a high speed in a forward direction.

29. The hydromechanical transmission system according to claim 18, wherein the synchronizing assemblies are three position synchronizers.

30. The hydromechanical transmission system according to claim 16, wherein the engaging means are clutches having friction discs.

31. A continuously variable transmission comprising:
an input means;
a variator connected to the input means;
first and second output means for outputting a combined power from the input means and variator means;
first and second synchronizing means for selectively receiving power from the input means and the variator; and first and second engaging means for alternatingly connecting the engaged combined output with the first and second output means.

32. The continuously variable transmission according to claim 31, further comprising a means for combining power from the input member and the variator.

33. The continuously variable transmission according to claim 32, further comprising first and second hubs rotatably connected to the first and second output means and the first and second synchronizing means.

34. The continuously variable transmission according to claim 31, wherein the variator includes a motor and a pump.

35. The continuously variable transmission according to claim 33, wherein the means for combining power is a planetary arrangement.

36. The continuously variable transmission according to claim 33, wherein each of the first and second output means comprise a low-speed reduction gear and a high-speed reduction gear, the low and high-speed reduction gears of the first and second output means drivingly engage the combined power from the means for combining, and wherein the first and second synchronizing means selectively synchronize the first and second hubs with the low and high-speed reduction gears.

37. The continuously variable transmission according to claim 36, wherein when the first means for synchronizing synchronizes the first hub with the low-speed reduction gear of the first output means, and when the first engaging means is engaged, the transmission outputs a low speed in a forward direction.

38. The continuously variable transmission according to claim 36, wherein when the second means for synchronizing synchronizes the second hub with the low-speed reduction gear of the second output means, and when the second engaging means is engaged, the transmission outputs a low speed in a reverse direction.

39. The continuously variable transmission according to claim 36, wherein when the first means for synchronizing synchronizes the first hub with the high-speed reduction gear of the first output means, and when the first engaging means is engaged, the transmission outputs a high speed in a reverse direction.

40. The continuously variable transmission according to claim 36, wherein when the second means for synchronizing synchronizes the second hub with the high-speed reduction gear of the second output means, and when the second engaging means is engaged, the transmission outputs a high speed in a forward direction.

41. The continuously variable transmission according to claim 31, wherein the first and second synchronizing means are three position synchronizers.

42. The continuously variable transmission according to claim 31, wherein the engaging means are clutches having friction discs.

43. A continuously variable transmission comprising:
an input member;
a planetary output shaft connected to the input member and having a first and second planetary output gear;
a first output member having a first low-speed reduction gear and a first high-speed reduction gear; and
a second output member having a second low-speed reduction gear and a second high-speed reduction gear,
wherein, the first planetary output gear directly meshes the first low-speed reduction gear, and the second planetary output gear directly meshes the second high-speed reduction gear.

44. The continuously variable transmission according to claim 43, further comprising a first and second engaging means connected to the first and second output members respectively and configured to alternatingly connect the first and second output members to a final output member.

45. The continuously variable transmission according to claim 43, further comprising first and second synchronizers connected to the first and second output members, respectively, and configured to transfer power from the first and second planetary output gears to one of the low or high-speed reduction gears of the first or second output members.

46. A method for shifting a hydromechanical transmission, comprising the steps of:
providing a first and second power source;
outputting a power of the first and second power source;
synchronizing a speed of the output with a rotatable member using a synchronizing assembly;
alternately engaging the synchronized rotatable member with an output member using an engaging means; and
outputting the power to a final output member.

47. The method according to claim 46, wherein the first power source is an internal combustion engine, and the second power source is a pump and motor.

48. The method according to claim 46, further comprising the steps of:
synchronizing the speed of the combined output with a second rotatable member;
disconnecting the first synchronized rotatable member from the output member; and
alternately connecting the second synchronized rotatable member to a second output member; and
outputting the power to the final output member.

49. The method according to claim 48, wherein the rotatable member is a first hub rotatably mounted to the output member, and the second rotatable member is a second hub rotatably mounted to the second output member.

50. A method of selectively activating a synchronizer and a clutch of a hydromechanical transmission, to produce a broader speed range, comprising the steps of:
providing a first and second power source;
outputting a combined power of the first and second power source;
activating a first synchronizer to synchronize a speed of the combined output with a rotatable member;
activating a clutch to connect the synchronized rotatable member to an output member;
outputting the power to a final output member;
activating a second synchronizer to synchronize a speed of the combined output with a second rotatable member;
deactivating the clutch; and
activating a second clutch to connect the synchronized second rotatable member to the output member.

51. The method according to claim 50, wherein the first power source is an internal combustion engine, and the second power source is a pump and motor.

52. The method according to claim 50, wherein the rotatable member is a first hub rotatably mounted to the output member, and the second rotatable member is a second hub rotatably mounted to the second output member.

* * * * *